(12) United States Patent
Barnes et al.

(10) Patent No.: US 11,128,198 B2
(45) Date of Patent: Sep. 21, 2021

(54) ELECTRIC MOTOR

(71) Applicant: Dyson Technology Limited, Wiltshire (GB)

(72) Inventors: Andrew Simeon Barnes, Bath (GB); Nigel Youatt Dymond, Swindon (GB); Andrew Charlton Clothier, Swindon (GB)

( * ) Notice: Subject to any disclaimer, the term of this patent is extended or adjusted under 35 U.S.C. 154(b) by 372 days.

(21) Appl. No.: 15/376,427

(22) Filed: Dec. 12, 2016

(65) Prior Publication Data

US 2017/0170709 A1 Jun. 15, 2017

(30) Foreign Application Priority Data

Dec. 11, 2015 (GB) ..................................... 1521892

(51) Int. Cl.
| | | |
|---|---|---|
| *H02K 15/02* | (2006.01) | |
| *H02K 7/14* | (2006.01) | |
| *H02K 1/14* | (2006.01) | |
| *H02K 5/20* | (2006.01) | |
| *H02K 37/16* | (2006.01) | |

(Continued)

(52) U.S. Cl.
CPC ............... *H02K 7/14* (2013.01); *H02K 1/141* (2013.01); *H02K 1/143* (2013.01); *H02K 1/27* (2013.01); *H02K 3/524* (2013.01); *H02K 5/20* (2013.01); *H02K 7/08* (2013.01); *H02K 9/06* (2013.01);

(Continued)

(58) Field of Classification Search
CPC .. H02K 7/14; H02K 7/08; H02K 1/27; H02K 15/028; H02K 9/06; H02K 21/18; H02K 3/524; H02K 1/143; H02K 1/141; H02K 37/16; H02K 21/185; H02K 5/20;

(Continued)

(56) References Cited

U.S. PATENT DOCUMENTS 3,495,111 A * 2/1970 Haydon ................. H02K 3/525
310/156.01
3,593,049 A 7/1971 Dittrich (Continued)

FOREIGN PATENT DOCUMENTS

| CN | 1928346 | 3/2007 |
|---|---|---|
| CN | 206272382 U | 6/2017 |

(Continued)

OTHER PUBLICATIONS

Received STIC search report from EIC 2800 searcher Samir Patel dated Sep. 21, 2018.*

(Continued)

*Primary Examiner* — Shawki S Ismail
*Assistant Examiner* — Htet Z Kyaw
(74) *Attorney, Agent, or Firm* — Faegre Drinker Biddle & Reath LLP

(57) ABSTRACT

An electric motor including: a frame; a rotor assembly including a magnet, a bearing assembly, an impeller, and a shaft; and a stator assembly including a stator core and a bobbin. The frame has an inner wall and an outer wall, the outer wall surrounds the inner wall and defines an annular channel between the inner wall and the outer wall, and diffuser vanes extend from the inner wall to the outer wall through the annular channel. The inner wall defines a bore for supporting the rotor assembly, and the outer wall defines a substantially cylindrical outer casing of the motor.

13 Claims, 4 Drawing Sheets

(51) Int. Cl.
| | |
|---|---|
| *H02K 9/06* | (2006.01) |
| *H02K 3/52* | (2006.01) |
| *H02K 21/18* | (2006.01) |
| *H02K 1/27* | (2006.01) |
| *H02K 7/08* | (2006.01) |

(52) U.S. Cl.
CPC ........... *H02K 15/028* (2013.01); *H02K 21/18* (2013.01); *H02K 21/185* (2013.01); *H02K 37/16* (2013.01)

(58) Field of Classification Search
CPC ........ H02K 2213/03; H02K 9/02; H02K 9/04; H02K 5/18
USPC .......................................................... 310/63
See application file for complete search history.

(56) References Cited

U.S. PATENT DOCUMENTS

| | | | |
|---|---|---|---|
| 4,166,265 A | 8/1979 | Reynolds et al. | |
| 4,333,026 A * | 6/1982 | Bock ........................ | H02K 5/04 310/257 |
| 4,927,367 A * | 5/1990 | Salvagno ............. | H05K 9/0039 200/507 |
| 5,019,737 A | 5/1991 | Bruno | |
| 5,943,760 A | 8/1999 | Barzideh et al. | |
| RE36,545 E | 2/2000 | Steiner | |
| 7,345,386 B2 * | 3/2008 | Dano ..................... | H02K 11/33 310/61 |
| 8,157,524 B2 * | 4/2012 | Nicgorski ............. | F04D 29/663 416/169 A |
| 8,395,289 B2 * | 3/2013 | Tian ........................ | H02K 5/18 310/61 |
| 10,184,487 B2 * | 1/2019 | Hayamitsu ................ | A47L 5/28 |
| 10,309,420 B2 * | 6/2019 | Johnson ................ | F04D 29/665 |
| 2001/0005943 A1 * | 7/2001 | Fukumoto ............. | A45D 20/12 34/96 |
| 2003/0098660 A1 | 5/2003 | Erdman et al. | |
| 2006/0280630 A1 * | 12/2006 | Lee ...................... | F04B 35/045 417/417 |
| 2007/0280829 A1 * | 12/2007 | Stevens ................. | F04D 29/326 416/189 |
| 2009/0142204 A1 | 6/2009 | Yamamoto et al. | |
| 2009/0191055 A1 * | 7/2009 | Li .......................... | F04D 29/329 415/220 |
| 2010/0117468 A1 * | 5/2010 | Kurita ................... | F04D 19/002 310/71 |
| 2010/0158679 A1 * | 6/2010 | Aust ...................... | F04D 17/122 415/199.1 |
| 2011/0074230 A1 * | 3/2011 | Hasegawa .............. | H02K 1/187 310/43 |
| 2012/0267972 A1 * | 10/2012 | Leung ...................... | H02K 5/15 310/71 |
| 2013/0270945 A1 * | 10/2013 | Ziegler .................... | H02K 7/08 310/90 |
| 2013/0302146 A1 * | 11/2013 | Dyson ...................... | F04D 25/08 415/126 |
| 2014/0050600 A1 | 2/2014 | Kodato et al. | |
| 2014/0183991 A1 | 7/2014 | Kulkarni et al. | |
| 2014/0265700 A1 * | 9/2014 | Patterson ............. | H02K 1/2793 310/156.32 |
| 2014/0328684 A1 * | 11/2014 | King ..................... | F04D 29/056 416/95 |
| 2015/0093271 A1 | 4/2015 | Hiromoto | |
| 2015/0351599 A1 * | 12/2015 | Park .......................... | A47L 9/22 417/423.2 |
| 2016/0204676 A1 * | 7/2016 | Ziegler .................... | H02K 9/02 392/379 |
| 2017/0108010 A1 * | 4/2017 | Johnson ................ | F04D 29/665 |
| 2017/0164711 A1 * | 6/2017 | Childe .................... | H02K 5/24 |
| 2017/0170709 A1 | 6/2017 | Barnes et al. | |
| 2018/0100517 A1 * | 4/2018 | Sawada ................. | F04D 25/082 |

FOREIGN PATENT DOCUMENTS

| | | | |
|---|---|---|---|
| DE | 37 10 622 | | 10/1988 |
| EP | 1 437 817 | | 7/2004 |
| FR | 2 667 995 | | 4/1992 |
| GB | 2 248 728 | | 4/1992 |
| GB | 2 362 268 | | 5/2005 |
| GB | 2467966 | | 8/2010 |
| GB | 2513661 | | 11/2014 |
| GB | 2513664 | | 11/2014 |
| JP | S48-19392 | * | 6/1973 |
| JP | 54-48306 | | 4/1979 |
| JP | 60-134401 | | 9/1985 |
| JP | S63-183400 U | | 11/1988 |
| JP | 3-203547 | | 9/1991 |
| JP | 10-191590 | | 7/1998 |
| JP | 2000-245109 | | 9/2000 |
| JP | 2002-171704 A | | 6/2002 |
| JP | 2008-312272 | | 12/2008 |
| JP | 2012-87748 A | | 5/2012 |
| JP | 2014-37817 | | 2/2014 |
| JP | 2015-92810 | | 5/2015 |
| JP | 48-19392 | | 2/2018 |
| RU | 2410818 C1 | | 1/2011 |
| UA | 19483 U | | 12/2006 |
| WO | 2008/041353 | | 4/2008 |
| WO | WO-2008041353 A1 * | 4/2008 | ............ H02K 11/33 |

OTHER PUBLICATIONS

International Search Report and Written Opinion dated Mar. 14, 2017, directed to International Application No. PCT/GB2016/053704; 12 pages.
Search Report dated May 25, 2016, directed to GB Application No. 1521892.8; 2 pages.
Notification of Reason for Rejection dated Sep. 18, 2018, directed to JP Application No. 2016-240188; 8 pages.
Official Action dated Apr. 3, 2019, directed to RU Application No. 2018125059; 11 pages.
The First Office Action dated Sep. 29, 2018, directed to CN Application No. 201611140022.3; 16 pages.
Notification of Reason for Rejection dated Sep. 28, 2020, directed to JP Application No. 2016-240188; 13 pages.
Notification of Reason for Rejection dated Jul. 20, 2020, directed to JP Application No. 2019-163193; 4 pages.

* cited by examiner

ELECTRIC MOTOR

REFERENCE TO RELATED APPLICATIONS

This application claims the priority of United Kingdom Application No. 1521892.8, filed Dec. 11, 2015, the entire contents of which are incorporated herein by reference.

FIELD OF THE INVENTION

The present invention relates to an electric motor.

BACKGROUND OF THE INVENTION

Electric motors have an extremely wide range of applications, for example from electric drives for vehicles to powering air moving devices such as vacuum motors and fans, and also handheld power tools and other consumer products. With electric motors being incorporated into more and more consumer products, it is important to find ways in which the cost of the electric motor can be kept down where possible. In addition, particularly when being used in handheld products, it is important to find ways in which the size and weight of an electric motor can be minimised. Improvements to electric motors are required that allow for reductions in size, weight and cost of electric motors but without negatively affecting their performance.

SUMMARY OF THE INVENTION

Aspects of this invention provide an electric motor comprising: a frame; a rotor assembly comprising a magnet, a bearing assembly, an impeller, and a shaft; and a stator assembly comprising a stator core and a bobbin. The frame has an inner wall and an outer wall, the outer wall surrounds the inner wall and defines an annular channel between the inner wall and the outer wall, and diffuser vanes extending from the inner wall to the outer wall through the annular channel. The inner wall defines a bore for supporting the rotor assembly, and the outer wall defines a substantially cylindrical outer casing of the motor.

As a result, a motor can be achieved that requires fewer components. The inner wall of the frame supports the rotor assembly, and the inner and outer walls also define a diffuser channel through which the airflow generated by the impeller passes. As such, no separate rotor supporting part or diffuser is required. By reducing the number of components in the motor, the cost of the motor can be reduced, as well as its size and weight.

The bore may support the rotor assembly at the bearing assembly. As such, the rotor can be supported such that the rotor assembly is balanced within the motor. This can reduce imbalance of the motor, and will minimise unwanted vibration which can affect the performance of the motor, and could reduce its lifetime.

The bearing assembly may comprise a pair of bearings fixed to the shaft and a spring located between the two bearings. The spring can then act to apply a pre-load to the outer races of each of the bearings. This improves the bearings' performance, and reduces the risk of them failing at high speed.

The bearing assembly may be fixed within the bore, the inner wall acting as a protective sleeve around the bearing assembly. As a result, the bearing assembly does not need a separate protective sleeve. As such, the size and weight of the motor can be kept down. Furthermore, fewer components are required to make up the motor and so the cost of the motor can also be minimised.

The outer wall may extend beyond the inner wall in an axial direction in at least one of an upstream and a downstream direction. As a result, by having the inner wall shorter than the outer wall, space is made available within the axial length of the outer wall that can be used to enclose other components of the motor. This helps to make the motor more compact. Furthermore, less material is required to form the inner wall, and so the weight of the motor can be reduced.

The diffuser vanes may have tail portions that extend axially beyond the inner wall to the outer wall. As a result, the effective length of the diffuser can be maximised, while the overall size of the motor can be reduced.

The inner wall may comprise at least one lug extending in an axial direction from one end of the inner wall. As a result, other components of the motor can be fixed to the frame using the lug.

The stator assembly may comprise at least one recess for receiving the at least one lug. The stator assembly can therefore be fixed to the frame using the lug.

The inner wall may comprise an annular protrusion extending axially from one end of the inner wall, the annular protrusion being receivable within a recess in a hub of the impeller. This can create a labyrinth seal inside the hub of the impeller. This can prevent foreign objects from entering into the bearing assembly which could damage the rotor assembly and significantly reduce the lifetime of the motor.

The impeller may be an axial impeller formed of aluminium, and may comprise a hub and a plurality of blades attached to the hub. Aluminium is very light and strong, and so the impeller can remain strong enough to withstand forces associated with high-speed applications, but the weight of the motor can also be minimised. The hub may comprise a recess for receiving an axially extending annular protrusion of the inner wall.

The inner wall may have an outer diameter that substantially matches an outer diameter of the hub. This creates an evenly proportioned air channel through the motor which helps to minimise turbulence and pressure losses through the motor which can negatively affect the performance of the motor.

The frame may be formed of zinc. Zinc has the advantage that it is acoustically dull, and so the frame is able to at least partly absorb noise generated by the motor during use.

The frame may comprise an electrical connection portion formed in the outer wall. The electrical connection portion may be a spade terminal. The electrical connection portion may be a DC reference connection. As a result, no additional connector part is required, and therefore the number of components can be reduced. In turn this can help to minimise the cost of the motor and can also help to reduce the size of the motor.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
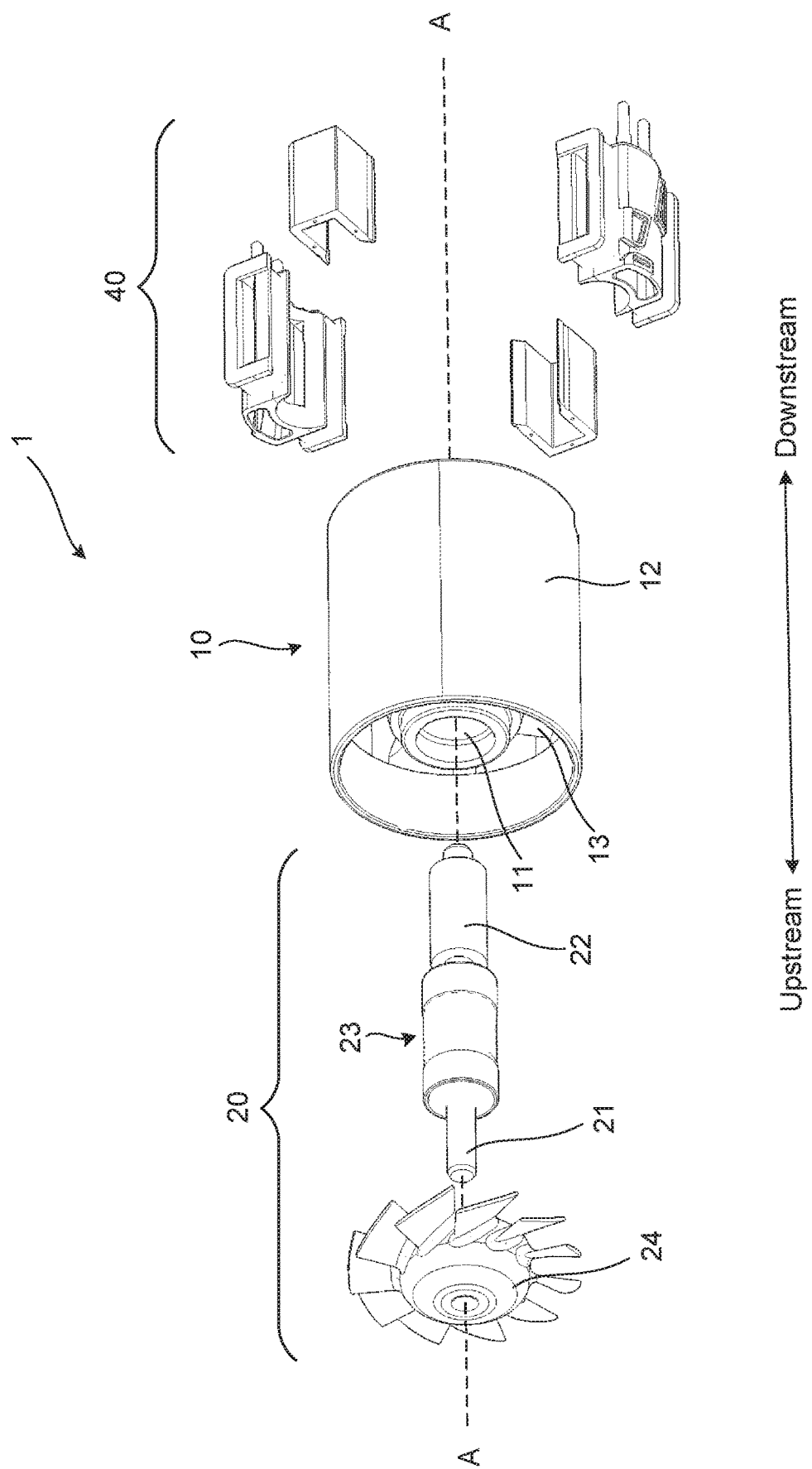
FIG. 1 is an exploded perspective view of a motor.

For the sake of clarity, the term "axial" is intended to mean in the direction of an axis running along a rotational axis of the motor as depicted by axis A-A in FIG. 1. In addition, the directional terms "upstream" and "downstream" referred to herein refer to the direction of airflow through the motor when in use and are further clarified by the double headed arrow in FIG. 1.

Figure 2:
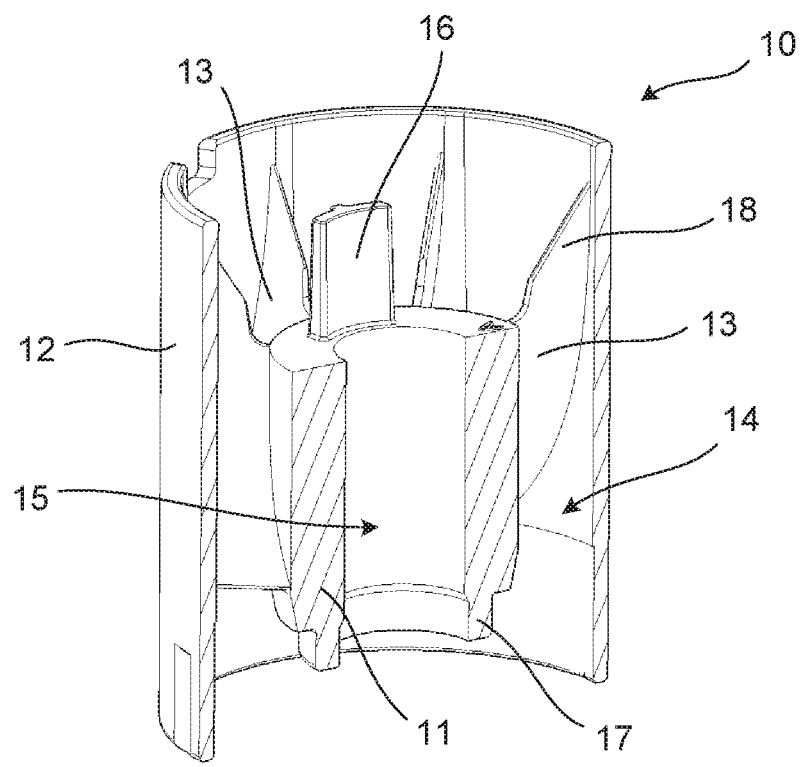
FIG. 2 shows a cross section through a frame of the motor of FIG. 1.

FIG. 1 is an exploded perspective view of a motor 1. The motor 1 comprises a frame 10, a rotor assembly 20 and a stator assembly 40. A cross section through the frame 10 is shown in FIG. 2. The frame 10 comprises an inner wall 11 and an outer wall 12. The outer wall 12 surrounds the inner wall 11 such that an annular channel 14 is defined between them. A number of diffuser vanes 13 extend between the inner wall 11 and the outer wall 12 through the annular channel 14. The inner wall 11 is shorter in length then the outer wall 12, and the inner wall 11 is positioned such that the outer wall 12 extends axially beyond the inner wall 11 in both the upstream and downstream directions. In alternative embodiments, the inner wall may be positioned differently such that the outer wall extends beyond the inner wall in just one of the upstream or downstream directions.

The frame 10 is formed of zinc and can be formed, for example, by machining or die-casting, or a combination method using both machining and die-casting. Zinc is an acoustically dull material and so a zinc frame 10 is able to effectively absorb acoustic frequencies generated by the motor 1 during use. The zinc frame 10 therefore acts to reduce the overall level of noise generated by a product inside of which the motor 1 is incorporated.

The diffuser vanes 13 extend between the inner wall 11 and the outer wall 12, and extend along substantially the whole length of the inner wall. In addition, the diffuser vanes 13 have tail portions 18 that extend axially downstream beyond the inner wall to the outer wall. The diffuser vanes 13 are therefore longer at a radially outer part of the annular channel 14 than at a radially inner part of the annular channel 14. This has the benefit that the diffuser vanes have a longer effective length acting on the airflow whilst still allowing the size and weight of the motor to be kept to a minimum by reducing the axial length of the inner wall 11.

The inner wall 11 is cylindrical and defines a bore 15. The inner wall 11 can support the rotor assembly 20 within the bore 15 when the motor 1 is assembled. In addition, the inner wall has a lug 16 that extends from one end of the inner wall 11 in an axial direction. In particular the lug 16 extends axially in a downstream direction. The lug 16 provides a mounting point onto which the stator assembly 40 can be easily mounted in order that the stator assembly 40 can be secured to the frame 10. FIG. 2 shows a single lug 16, however multiple lugs 16 may be provided depending on the number of mounting points required on the stator and other requirements of the motor. Mounting of the stator assembly 40 to the lugs 16 of the frame 10 will be described in more detail below with reference to FIGS. 5 and 6.

The inner wall 11 has an axially extending annular protrusion 17 which extends from an end of the inner wall 11 in an opposite direction to the lug 16. This axially extending annular protrusion 17 can be received into a complimentary recess on the impeller 24 to form a labyrinth seal. This will be described in more detail below with reference to FIG. 4.

Figure 3:
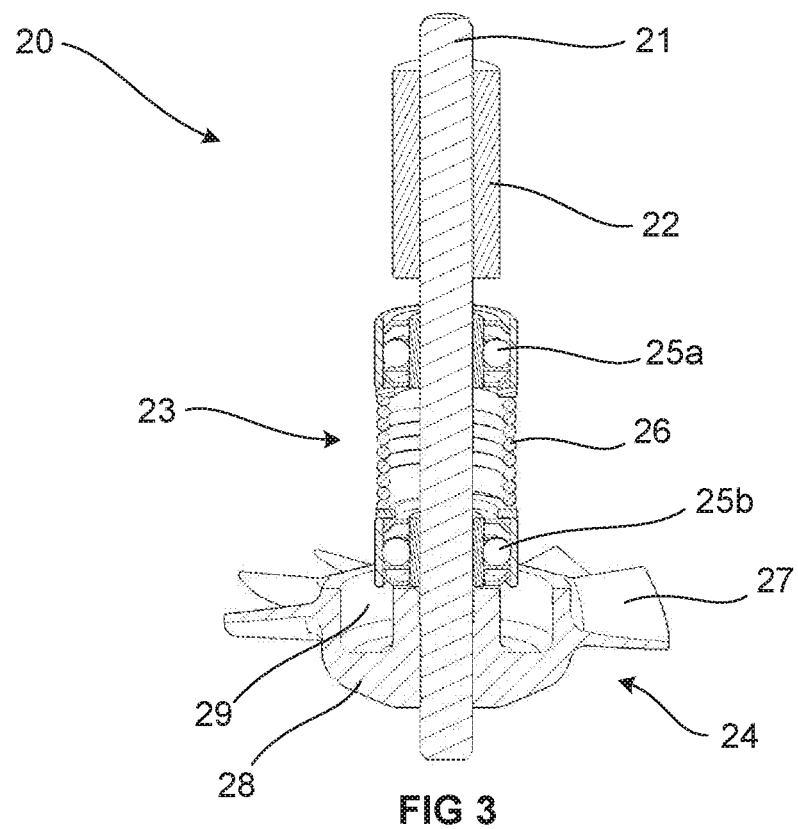
FIG. 3 shows a cross section through a rotor assembly of the motor of FIG. 1.

The rotor assembly 20 comprises a shaft 21, a magnet 22, a bearing assembly 23 and an impeller 24. A cross-section through the rotor assembly 20 is shown in FIG. 3. The magnet 22, bearing assembly 23 and impeller 24 are all fixed directly to the shaft 21 by one or a combination of an interference fit and adhesive. The magnet 22 is a bonded permanent magnet of the sort typically used in permanent magnet brushless motors. In the example shown, the magnet 22 is a four-pole permanent magnet. The bearing assembly 23 comprises a pair of bearings 25a, 25b and a spring 26 separating the bearings 25a, 25b. The spring 26 acts to pre-load each of the outer races of the bearings 25a, 25b to reduce wear of the bearings during use. Washers may also be provided between the spring 26 and each of the bearings 25a, 25b.

As described above, the rotor assembly 20 is supported in the frame 10 by the inner wall 11. The bearing assembly 23 is fixed inside the bore 15 of the inner wall 11 such that the inner wall 11 of the frame 10 acts as a protective sleeve around the bearing assembly 23. This eliminates the need for the bearing assembly 23 to have a separate protective sleeve, and helps to reduce the size and weight of the motor 1. The outer races of the bearings 25a, 25b are fixed to the inside circumference of the inner wall 11 in the bore 15, and can be fixed, for example, by adhesive.

The impeller 24 shown in the Figures is an axial impeller with a plurality of blades 27 spaced circumferentially around, and extending radially out from, a central hub 28. During use, as each blade 27 spins it creates sound waves at a particular frequency. It is therefore possible to design the impeller in such a way as to reduce its acoustic impact. The impeller 24 shown in FIGS. 3 and 5 comprises eleven blades. However, the number of blades 27 can differ according to the acoustic requirements of the motor 1 and/or the product into which the motor is to be incorporated.

The impeller 24 is formed by machining aluminium. Aluminium is a very light material and therefore by using it to form the impeller 24 this helps to counteract some of the additional weight included in the motor 1 by using zinc to create the frame 10. The motor 1 described herein is intended to be run at rotational speeds of around 75 to 110 krpm. The magnitude of the forces acting on the impeller 24 at these high speeds are very great. Thankfully, despite being light, aluminium is also very strong and so the impeller 24 is capable of withstanding these large forces when it rotates at high speed.

Figure 4:
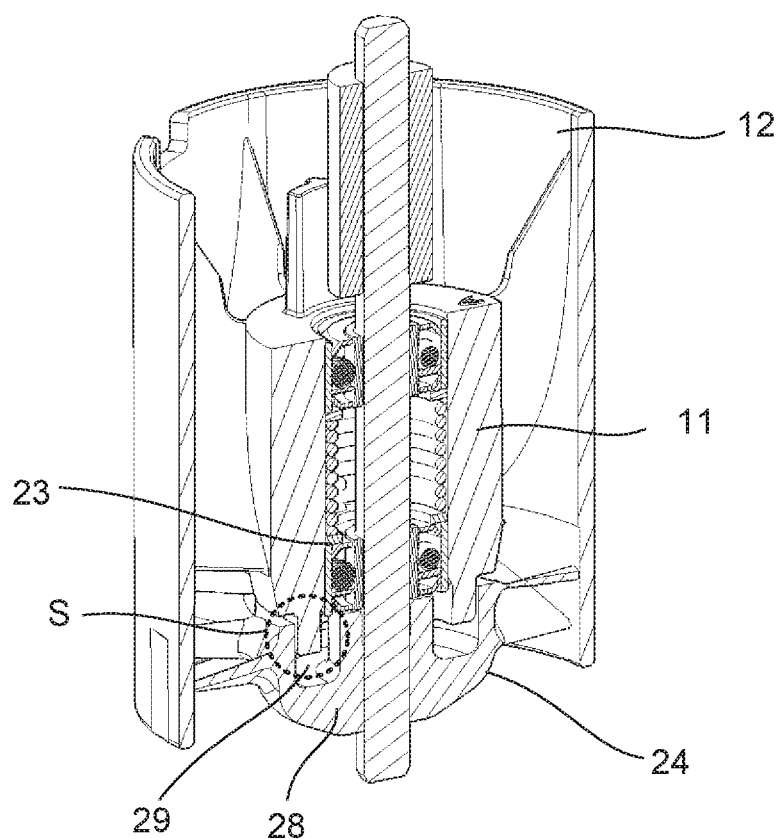
FIG. 4 is a cross section through the assembled frame and rotor assembly of FIGS. 2 and 3.

FIG. 3 shows that the hub 28 of the impeller 24 comprises a recess 29 in the downstream side of the hub. By having a recess 29, this further decreases the weight of the impeller 24, which counteracts even more of the weight added by using zinc to form the frame 10. In addition, the recess 29 is annular and provides a cavity into which an axially extending portion of the inner wall of the frame can extend. This creates a labyrinth seal inside the hub 28 of the impeller 24 which prevents foreign objects, such as hair and dust, from entering into the bearing assembly 23 which could damage the rotor assembly and significantly reduce the lifetime of the motor. The labyrinth seal can be seen in FIG. 4 which shows a cross section through the assembled frame 10 and rotor assembly 20. The labyrinth seal is highlighted at area S. FIG. 4 shows how the inner wall 11 of the frame 10 acts as a protective sleeve around the bearing assembly 23, as previously described.

Figure 5:
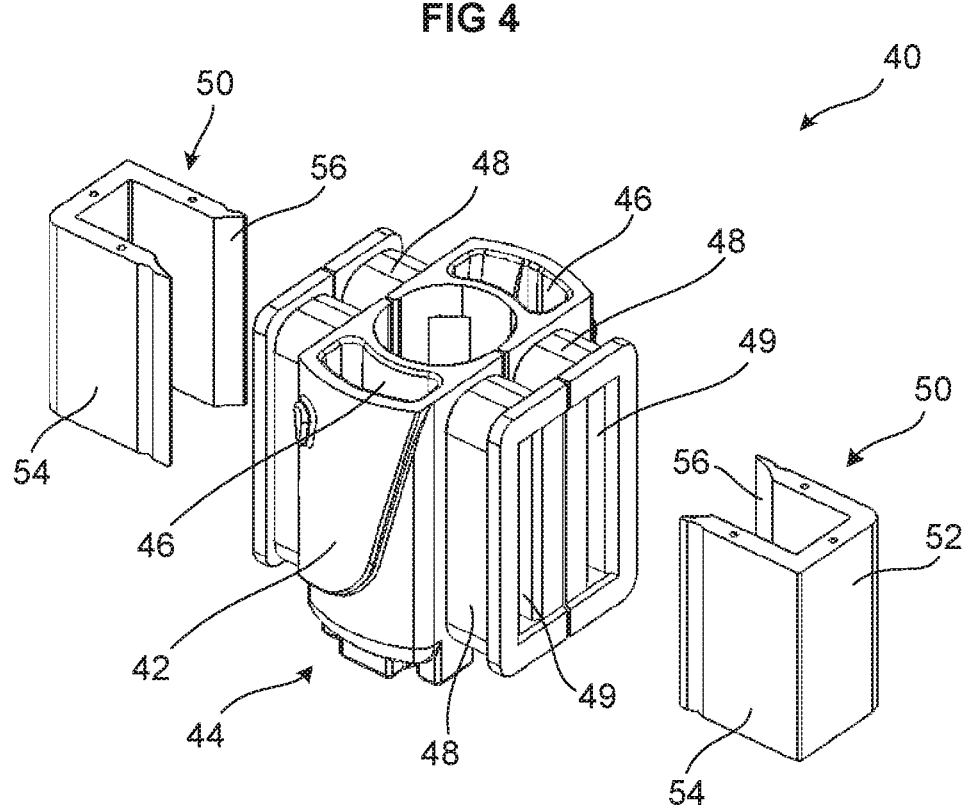
FIG. 5 shows a perspective view of a stator assembly.

FIG. 5 shows the stator assembly 40. The stator assembly 40 comprises two c-shaped stator cores 50 and a bobbin assembly 44. Each c-shaped core 50 (also referred to as a c-core) comprises a back 52 and two pole arms 54 extending from the back 52. At the end of each pole arm 54 is a pole face 56. The bobbin assembly 44 comprises a centre portion 42 and outwardly extending arm portions 48 that extend from the centre portion 42. The centre portion 42 defines a bore which surrounds the magnet 22 of the rotor assembly 20 when the motor is assembled. Windings (not shown) for inducing a magnetic field in the c-cores 50 can be wound around the arm portions 48 of the bobbin assembly 44. The arm portions 48 are provided with through holes 49 which allow the pole arms 54 of the c-cores 50 to slot through the arm portions 48 of the bobbin assembly 44 such that a winding is positioned around each pole arm 54. The through holes 49 in the arm portions also extend through to the centre portion 42 of the bobbin assembly 44, and openings are provided in the centre portion 42 such that the pole faces 56 of the c-cores 50 are exposed to the magnet 22 when the motor is assembled.

Figure 6:
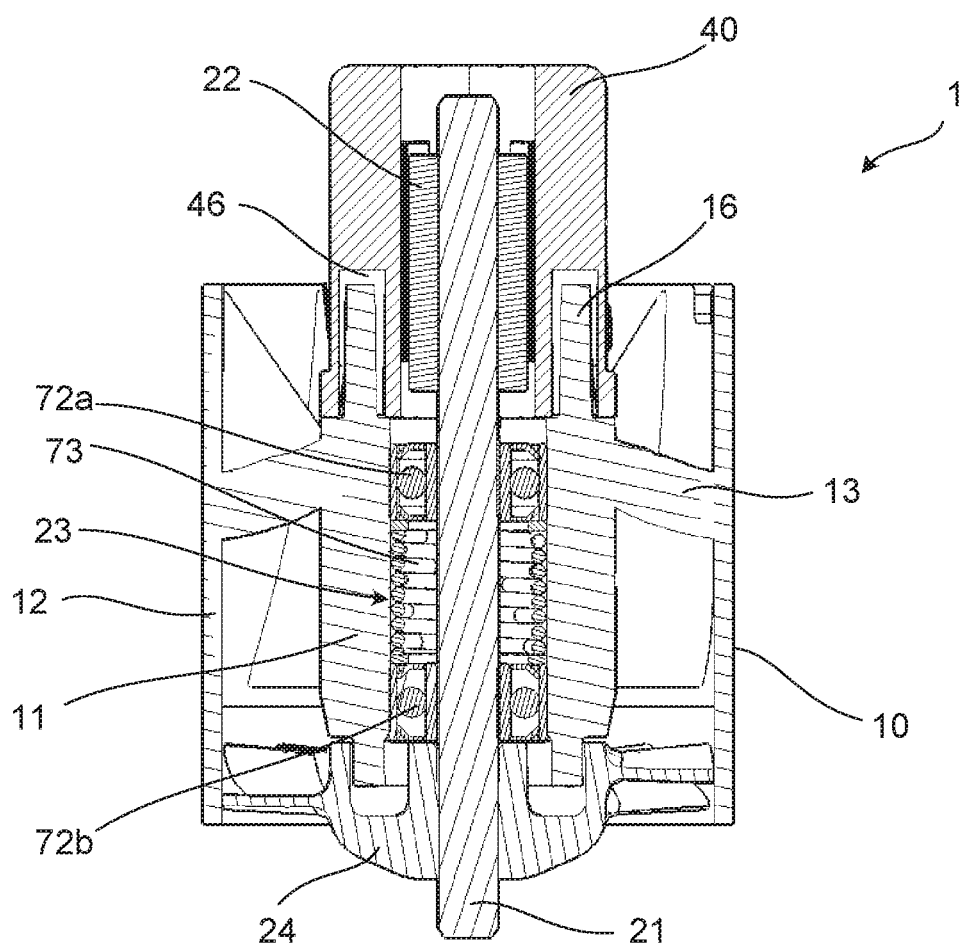
FIG. 6 shows a cross section through the assembled motor of FIG. 1.

The bobbin assembly 44 comprises recesses 46 that are configured to align with the lugs 16 on the frame 10 such that the stator assembly 40 can be fixed to the frame 10. The lugs 16 are receivable into the recesses 46, and can be fixed in place using adhesive and/or interference fit. FIG. 6 shows a cross section through the assembled motor 1. This view easily shows lugs 16 positioned inside the recesses 46 of the bobbin assembly 44. The recesses 46 may be large enough so as to be able to accommodate the lugs 16 as well as a volume of adhesive. During assembly of the motor 1, adhesive may be applied into the recesses 46, or to the outside of the lugs, or both prior to bringing the stator assembly 40 and the frame 10 together.

The bearing assembly 23 comprises a pair of bearings 72a, 72b, and a spring 73 separating the bearings 72a, 72b. The spring 73 acts to pre-load each of the outer races of the bearings 72a, 72b to reduce wear of the bearings during use. Washers may also be provided between the spring 73 and each of the bearings 72a, 72b.

Whilst particular embodiments have thus far been described, it will be understood that various modifications may be made without departing from the scope of the invention as defined by the claims.

The invention claimed is:

1. An electric motor comprising:
   a rotor assembly comprising a magnet, a bearing assembly, an impeller, and a shaft;
   a stator assembly comprising a stator core and a bobbin; and
   a frame comprising:
      an inner wall;
      an outer wall, the outer wall surrounding the inner wall and defining an annular channel between the inner wall and the outer wall, and
      diffuser vanes extending from the inner wall to the outer wall through the annular channel, wherein the diffuser vanes are in contact with the inner and outer walls,
   wherein the inner wall defines a bore for supporting the rotor assembly, and wherein the inner wall directly contacts the rotor assembly, and the outer wall defines a cylindrical outer casing of the motor.

2. The electric motor of claim 1, wherein the bore supports the rotor assembly at the bearing assembly.

3. The electric motor of claim 1, wherein the bearing assembly comprises a pair of bearings fixed to the shaft and a spring located between the two bearings.

4. The electric motor of claim 1, wherein the bearing assembly is fixed within the bore, the inner wall acting as a protective sleeve around the bearing assembly.

5. The electric motor of claim 1, wherein the outer wall extends beyond the inner wall in an axial direction in at least one of an upstream and a downstream direction.

6. The electric motor of claim 1, wherein the diffuser vanes have tail portions that extend axially beyond the inner wall to the outer wall.

7. The electric motor of claim 1, wherein the inner wall comprises at least one lug extending in an axial direction from one end of the inner wall.

8. The electric motor of claim 7, wherein the stator assembly comprises at least one recess for receiving the at least one lug.

9. The electric motor of claim 1, wherein the inner wall comprises an annular protrusion extending axially from one end of the inner wall, the annular protrusion being receivable within a recess in a hub of the impeller.

10. The electric motor of claim 1, wherein the impeller is an axial impeller formed of aluminium, and comprises a hub and a plurality of blades attached to the hub.

11. The electric motor of claim 10, wherein the hub comprises a recess for receiving an axially extending annular protrusion of the inner wall.

12. The electric motor of claim 10, wherein the inner wall has an outer diameter that matches an outer diameter of the hub.

13. The electric motor of claim 1, wherein the frame is formed of zinc.

* * * * *